C. A. LESTER.
LENS.
APPLICATION FILED JUNE 25, 1918.
1,308,431.
Patented July 1, 1919.
2 SHEETS—SHEET 1.
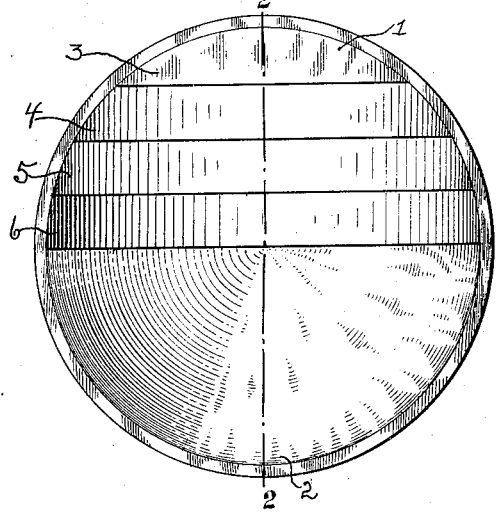
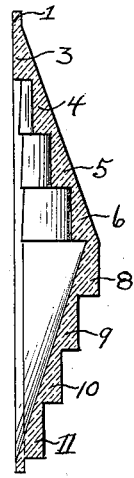
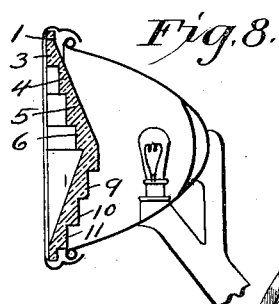
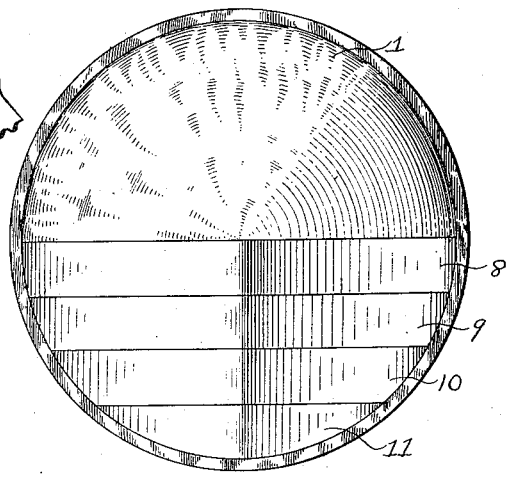
Charles A. Lester INVENTOR
BY
ATTORNEYS.

C. A. LESTER.
LENS.
APPLICATION FILED JUNE 25, 1918.
1,308,431.
Patented July 1, 1919.
2 SHEETS—SHEET 2.
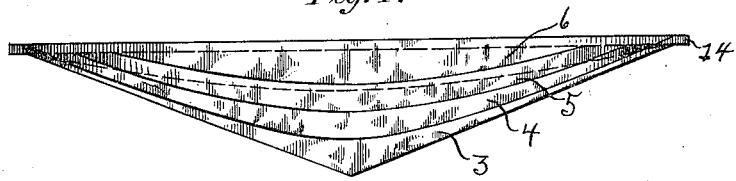
Fig: 4.
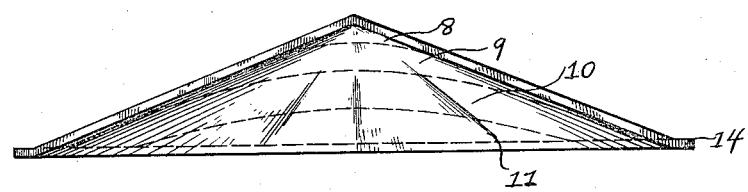
Fig: 5.
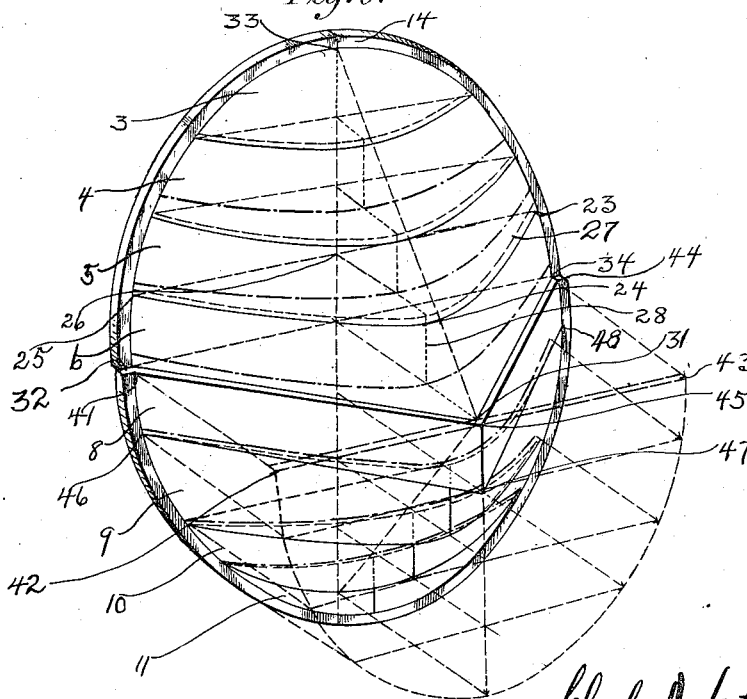
Fig: 6.
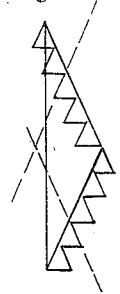
Fig: 7.
Charles A. Lester INVENTOR
BY Mock & Blum
ATTORNEYS.

UNITED STATES PATENT OFFICE.

CHARLES A. LESTER, OF WINONA, MINNESOTA.

LENS.

1,308,431.      Specification of Letters Patent.      Patented July 1, 1919.

Application filed June 25, 1918. Serial No. 241,775.

*To all whom it may concern:*

Be it known that I, CHARLES A. LESTER, citizen of the United States, residing at Winona, in the county of Winona and State of Minnesota, have invented certain new and useful Improvements in Lenses, of which the following is a specification.

My invention relates to new combinations of surfaces in a body of refracting material such as glass to produce a new and original lens, especially such lenses which are used to properly direct rays of light sent forth by parabolic reflectors now commonly used upon automobiles and elsewhere.

The ordinary automobile headlight, as is well known, comprises a small electric lamp which is placed as accurately as possible at the focus of a parabolic reflector, so that, if the source of light were a point and were placed with sufficient accuracy, all reflected rays would be parallel to the parabolic axis, and horizontal when the headlight is so placed that its axis is horizontal.

The lens shown in the following description and drawings, which illustrate the principles used in and the construction of an embodiment of my invention, properly directs the rays issuing from an ordinary parabolic reflector as above mentioned, controlling both the properly directed rays and the so-called "stray" or aberrant rays in such a manner as to prevent a dangerous glare in the eyes of approaching drivers or pedestrians, and at the same time produce an amount of illumination equal to the open light before the application of the lens:

When the filament is so placed that its center corresponds to the focal point of the reflector, rays of light coming from this point, and only rays coming from this point will be reflected parallel to the axis of the parabola. Referring to the upper half of the reflector, rays issuing from points of the filament behind the focus, that is, between the focus and the vertex of the parabola, will be reflected upwardly; rays issuing from points in front of the focus will be reflected downwardly. The reflection of non-focal rays will be reversed in the lower half of the parabola.

Hence, the rays at a given point of the reflector which reach it from all points of the filament are reflected in the form of a pencil of diverging rays whose apex is at said given point, and whose apex angle is definite, depends upon the relative dimensions of the reflector and the filament, and is at its maximum in a plane passing through the axis and said given point. This maximum angle of deviation at any given point may be designated as angle D. The deviation will vary at different points on the reflector, being greatest at a point intersected by a line erected from the focus perpendicular to the axis, and diminishing as the given point recedes from this point toward the vertex or toward the perimeter.

If we now consider a circle drawn on the surface of the reflector corresponding to the circle produced by the section of the reflector by a plane perpendicular to the axis and passed through the reflector at some point between the vertex and the perimeter; while the angle D remains the same at all points thereon (as ten degrees, let us say), the angle at which the stray or aberrant rays rise from the ground (or horizontal) varies for each meridian, being a maximum in the vertical plane or meridian, where said angle of rise, which may be designated by angle R, equals angle D, and being a minimum in the horizontal plane or meridian, where angle R equals zero.

If, in the upper half of the reflector, we consider the various planes or meridians in which the rays are reflected, each plane being through the axis of the parabola, and consider them in the order of their upward inclination to the horizontal, which inclination may be designated by X degrees, then $$R \text{ equals } X/90 \text{ of } r$$

where $r$ is the value of R when it is measured in the vertical plane, or at 90 degrees, and R is the maximum divergence of the rays from the horizontal (angle R) in a meridian at X degrees to the horizontal. Thus at 30 degrees, R equals 30/90 of 10 degrees, or 3⅓ degrees, in the example before mentioned. In other words, angle D remains 10 degrees, while angle R is at this point but 3⅓ degrees. A similar formula may be applied to the lower half when the arc of the circle is numbered from 0 degrees at the horizontal to 90 degrees at the bottom.

In eliminating the glare at all points, and at the same time preserving the illumination, the first requisite is to keep angle R equal to zero at all points, or cause all the stray or aberrant rays which rise above the horizontal to be brought to the horizontal, no matter from what point nor which half of the reflector they are reflected. This will require a lens that will have a different prism value for every point on any vertical section of the lens except the vertical section through the axis. Even in this section the prism should vary slightly to fulfil all theoretical requirements, but practically the variation is of so little importance that it may be disregarded. Thus if angle R be considered ten degrees at all points on the vertical meridian or diameter, then a prism which will deviate the rays 10 degrees will produce the desired results and bring rising rays to horizontal in the vertical meridian only, and in any other vertical section a deviation of ten degrees would be too much, reducing R to a falling angle instead of a rising angle, thus throwing too much light toward the ground and reducing the volume of light available for distant illumination. For instance, if a vertical plane be passed through the reflector, parallel to its axis, and another plane be passed through its axis and making an angle of 45 degrees to the vertical, at the point on the reflector where the two planes intersect the value of angle R is 5 degrees (according to the formula given above), and the angle of deviation of the prism needed at that point to reduce angle R to zero would necessarily be five degrees. But at all other points on the line marking the intersection of the vertical plane with the reflector, 5 degrees deviation would be too much or too little as the point on said line was near or away from the horizontal plane through the axis, and it would have to vary in exactly the same ratio that angle R is shown to vary. At all points on the reflector where it is cut by the 45 degree plane, however, the value of angle R remains the same, and the deviating power of the required prism remains the same.

It can readily be shown that the refractive value of any plane section parallel to the axis through any conical lens varies in its prismatic power exactly in accordance with the formula here shown to be the case in the reflected rays from a parabolic reflector such as we are discussing. Therefore a cone-shaped lens whose base angle is the same as the angle of a prism which will deviate light the required number of degrees will when properly placed before the opening of such a reflector reduce angle R to zero at all points on the upper half of the reflector. On the lower half, however, the cone would be equivalent to a prism with the base up (considering any vertical section) instead of base down. Therefore, to obtain the same results in the lower half a lens would be needed one side of which was flat and the other a hollow surface the complement of the cone used for the upper half. That is, a hollow or concave conic lens whose conic surface would be equivalent to a mold made to fit the surface of the cone used for the upper half. One half of such a concave cone then would produce the required result of reducing angle R to zero in any vertical section. This only partially solves the problem however, as a cone refracts light rays toward its apex from all directions, so that a cone-shaped lens would be equivalent not only to a variable prism base down (considering the upper half only) but would be equivalent to a prism whose apex might be at any point on the circle bounding the base of the cone, and whose base would be at the apex of the cone. So angle D is corrected the same way at all points and rays in the horizontal meridian, in which angle R is zero, would be bent toward the axis to the extent of angle D, although remaining horizontal, and rays in other meridians would be bent proportionately. To obviate this difficulty I have devised a new and original refracting lens, having a combination of surfaces which may be described and illustrated as follows:—

Figure 1 is a back view of my lens, shown as applied to the mouth of a parabolic reflector.

Fig. 2 is a central section along line 2—2.

Fig. 3 is a front view.

Fig. 4 is a bottom view of the upper half of the lens.

Fig. 5 is a top view of the lower half of the lens.

Fig. 6 is a perspective view showing the construction of the complete lens, greatly exaggerated for illustrative purposes.

Fig. 7 is a section through the lens the same as at Fig. 2, showing certain modifications.

Fig. 8 is a view showing the combination of the lens and the reflector.

The completed lens may be considered as being produced in a certain manner from a cone, and a concave or hollow cone complementary to the regular cone, by cutting them in a manner to be herein disclosed, although, of course, the ordinary commercial methods of producing glass lenses, prisms, etc., in any desired shape, such as molding, grinding, etc., would be used in practice.

As shown in the drawings, the lens consists of any desirable number of glass segments or strips superposed one upon the other, there being eight of these segments or strips in this embodiment.

The upper half 1 of the lens is made from a half cone, that is a cone divided into halves, by a plane passing through its axis, as follows:—

Imagine the half cone placed with its triangular surface at the bottom, so that its axis coincides with the axis of the parabola, and its semi-circular base, whose diameter is equal to that of the circle forming the edge of the reflector, coincides with the upper half of said circular edge, as shown at 31, 32, 33, 34, Fig. 6. Now suppose a plane passed through the half cone parallel to the said triangular surface, and at any desired distance above it, as one inch, for example, as shown at 23, 24, 25, 26, Fig. 6. The front upper edge of the segment so formed (23, 24, 25) is a hyperbola. In order to give sufficient thickness to this segment, imagine a line drawn within it, parallel to the hyperbola and at an appropriate distance, say ⅛ to 3/16 inch therefrom, as shown at broken line 27, Fig. 6.

Imagine a line perpendicular to the base of the segment intersecting the line (27) parallel to said hyperbola (23, 24, 25) as shown at 28, and passed along said parallel line (27) so as to divide said segment and separate therefrom the lowest segment 6, Fig. 6, of the upper half of the lens.

This segment 6 has a lower surface whose front boundary consists of two straight lines at an angle with each other (the apex angle of the cone) and whose inner or rear boundary is a hyperbola parallel to but on a different horizontal plane than the hyperbola forming the upper rear margin of the segment. The upper front margin is the hyperbola formed by the section of the cone at this place. The rear surface is therefore a curved surface which corresponds to the path of the hyperbola forming the upper rear edge moved vertically downward to the lower surface of the segment, where it coincides and becomes identical with the hyperbola forming the lower rear margin, and its front surface, considered along a series of adjacent horizontal planes is composed of hyperbolic elements decreasing from the upper front boundary downward until at the lower boundary the elements are diverging straight lines. That is, the front surface is a portion of the surface of the original cone.

The next segment 5, Fig. 6, of the upper half of the lens, and the other segments 4 and 3, are similarly constructed. We may suppose another segment cut off the half cone by a plane parallel to the first-mentioned plane, and an inch above it (for instance.) In this segment the front boundaries of both top and bottom surfaces are hyperbolas. By drawing a curve in the top surface parallel to the hyperbola forming the front boundary thereof, and say ⅛ to 3/16 inch from said boundary, another generatrix is secured for a vertical line which intersects it, and is moved as a generator the same way as before, so that the second segment 5, Fig. 6, of the upper half of the lens is separated. Thus again for this and also for all the other upper segments, the front surface of the finished segment is a portion of the surface of the original cone.

Imagine a wooden cylinder placed in a lathe and turned down into a cone. Now imagine a similar cylinder put into a lathe and a hollow cone shaped cavity turned into the end of it of such size and shape as to exactly receive the cone previously turned. Now cut off the other end of the second cylinder above mentioned by a cut perpendicular to its axis and leaving at least enough wood between the apex of the hollow cone and the cut surface to correspond to the necessary thickness of glass to make a practicable lens. There will thus be produced a wooden model of the solid from which the lower half of the lens is made. This body, which will be termed the hollow cone, is divided by a section through its axis, and one of the halves thus obtained is used in the construction as herein described. The hollow surface is to be turned toward the reflector, and forms the rear surface of the completed lower half of the lens when all the sections thereof are superposed one upon the other.

The segments are to be cut from this hollow cone by passing horizontal planes through it parallel to the axis in a way similar to the construction of the segments forming the upper half of the lens already described. All allowance for thickness of glass must be made in front of the rear conic surface of each segment however, instead of behind the front conic surface as in the upper half of the lens.

Passing a horizontal plane a suitable distance below the upper surface of the hollow cone, as for instance one inch, removes a section having as its front edge the line forming the boundary of the section of the cylinder from which the half cone was formed, as shown at 42, 43, Fig. 6, for its rear surface the portion of the hollow cone surface constituting the rear of the upper segment of the lower half, and for its lateral surfaces the portions of the cylindrical surfaces of this portion of the segment. The upper rear boundary consists of two straight lines meeting at an angle, 32, 31, 34. Draw a line parallel to said rear boundary, a sufficient distance in front of it to allow for thickness of glass. From this line drop a line to the lower surface of this segment, perpendicular to the planes of the surfaces, and pass this line along the line parallel to the boundary above mentioned, thus cutting off a slice from the rear of the segment recently removed from the whole lower half hollow cone. This slice now has for its rear surface the hollow surface described above, for its front surface two perpendicular planes 41—46—47—45 and 45—47—48—44, Fig. 6. The front boundaries of the upper and lower surfaces consist of the straight lines forming the edges of the planes of the front surface. The rear edge of the upper surface is composed of the two straight lines parallel to the front boundaries. The rear boundary of the lower surface is the hyperbola formed by cutting the conic surface by a plane parallel to the axis, as described.

The remaining lower segments are formed by following the same directions for cutting as given for the first or upper segment, but the surfaces of the other segments have for their front surface each a curved surface which corresponds in outline to the hyperbola of the back of the upper surface of that segment. Thus, the second segment cut from the body from which all the segments are originally cut, has for its upper surface a surface bounded behind by the hyperbola formed by cutting the cone, identical with the lower rear boundary of the segment above it. A line is drawn on the upper surface of the segment parallel to the rear boundary and far enough in front of it to allow for thickness of glass. From a point on this line another line is dropped to the lower surface of the segment, perpendicular to both surfaces, and is then passed along the line parallel to the rear boundary of the upper surface just mentioned, in its movement always remaining perpendicular as described, thereby cutting off a portion or slice from the rear of the whole segment. The front surface then of this particular section, and of all the other lower sections except the first, may be described as a surface formed by a hyperbola in a horizontal plane moving in a direction perpendicular to said plane.

The lower half of the lens, when completed, is in practice to be joined permanently by continuous construction to the upper half, not slightly offset as shown in Fig. 6. It is thus shown in Fig. 6 to illustrate the fact that the rear surface of the lower lens and the front surface of the upper lens when taken together produce a complete mathematical cone, whose axis coincides with the axis of the reflector.

A disk-like periphery, 14, may be left on both portions of the lens, having its front and rear surfaces parallel, so that a suitable ring or other retaining means can grip the lens at this portion, and hold it on the reflector; or any other suitable means for retaining the lens in position may be employed. The disk here mentioned and shown at 14 in Fig. 6 is not offset with reference to the junction of the two halves, but is continuous as shown in the other views. Line 41—45—44 Fig. 6 will then coincide with line 32—31—34.

The lens as here described has a conical shaped outer surface on the upper half ending in the point of the cone at the center of the lens. Inasmuch, as the stray or aberrant rays of light are but few in the reflections from that portion of the reflector at or near the vertex, for the sake of a graceful outline and mechanical convenience it is not necessary to construct the actual lens on precisely these lines. The point of the cone may be rounded off or flattened and the sharp vertical ridge or angle on the front of the top lower segment may be treated in a similar manner without affecting the practical efficiency of the lens.

The vertical prismatic deviation of rays may be approximately increased by a modification of the non-conic surface if so desired. For instance, suppose a maximum vertical deviation of 10 degrees is desired, but it is considered undesirable to construct a lens based on a cone of (about) 18½ degrees base angle. Thus, if a cone of 9¼ degree base angle was thought desirable as a basis, prismoid segments such as described and made in accordance with above directions would have a deviating power of but (about) five degrees. In order to give the required deviation of ten degrees, the line parallel to the front boundary of any upper segment may be used as a generator as before, but instead of its path being directly downward at an angle of 90 degrees to the planes of the upper and lower surfaces the path must be downward and backward, always remaining in a horizontal plane, at an angle of 9¼ degrees from the perpendicular, until it arrives at the plane of the lower surface. This will make the vertical prismatic power double the value indicated by the base angle of the cone. Or any other combination of fractions of the required angle may be combined in the base angle of the cone and the angle of the non-conic surface to obtain the desired total prismatic power. In the lower segment, of course, the path of the hyperbola used as a generator for the non-conic surface would be downward and forward instead of downward and backward. This is shown in Fig. 7, which is a section through the line 2—2 of Fig. 1 if the lens were constructed in this way.

As a lens constructed in accordance with these directions is at present unknown, and as there is no name in mathematics nor physics at present used to indicate such a combination of curvatures and surfaces, I have named each one of the segments a prismoid lens, and the combination of the segments into a complete whole a prism-cone lens.

Rays of light reflected from a parabolic reflector in the manner described in an earlier part of this description will then be refracted through any vertical section of the lens in the same way that they would be refracted by a conical lens of the same size and angle referring to the top half, or through a concave cone lens complementary to the upper half referring to the lower half. In any transverse section however, the course of the rays would be entirely unchanged through the upper edge of each prismoid. As the boundaries of each prismoid are approached however, a slight refraction will occur which increases until it is greatest at the lower edge near the center, and which refracts rays toward the vertical diameter of the lens. This refraction is so slight as not to interfere with the volume of direct illumination, and is a slight advantage as regards stray horizontal rays, causing them to be slightly more diffused laterally.

Any portion or all of the lens may be made partially opaque or made of glass of any color, to conform to the laws, customs, or wishes of different localities, manufacturers or dealers.

While I have described a preferred embodiment of my invention, it is obvious that changes could be made in its details and I do not wish to be limited thereto.

I claim:—

1. A lens having an axis and embodying a series of superposed segments arranged above and below said axis, the front surfaces of the segments above said axis and the rear surfaces of the segments below said axis being conical, the opposite surfaces of said segments being hyperbolic.

2. In combination, a parabolic reflector, a source of light arranged substantially at the focus thereof and having non-focal portions, a lens arranged at the perimeter of said reflector and having its axis coincident with the axis of said reflector, the said lens embodying a series of superposed segments, the front surfaces of the segments above said axis, and the rear surfaces of the segments below said axis having a conical contour, and the respective opposite surfaces of said segments being hyperbolic.

3. In combination, a parabolic reflector, a source of light arranged substantially at the focus thereof and having non-focal portions, a lens arranged at the perimeter of said reflector, the said lens embodying a series of superposed segments, the front surfaces of the segments above said axis, and the rear surfaces of the segments below said axis having a conical contour, and the respective opposite surfaces of said segments being hyperbolic, the base angle of said conical surfaces being equal to the angle of a prism which will deviate the light rays the required maximum number of degrees.

4. A lens having an axis and embodying a series of superposed segments, the segments above said axis having front surfaces whose elements are hyperbolas of uniformly varying curvature and rear surfaces whose elements are hyperbolas of identical curvature, the first segment below said axis having front surfaces whose elements in a plane parallel to the upper surface of the segment are straight lines, the other segments below said axis having front surfaces whose elements in a plane parallel to said upper surface of the said segment are hyperbolas, the rear surfaces of all segments below said axis having elements in said plane which are hyperbolas of uniformly varying curvature.

In testimony whereof I hereunto affix my signature.

CHARLES A. LESTER.